United States Patent
Mundon et al.

(10) Patent No.: US 11,933,262 B2
(45) Date of Patent: Mar. 19, 2024

(54) POWER DISSIPATION IN WAVE ENERGY CONVERTER SYSTEMS

(71) Applicant: Oscilla Power, Inc., Seattle, WA (US)

(72) Inventors: Timothy R. Mundon, Seattle, WA (US); Joseph van 't Hoff, Delft (NL)

(*) Notice: Subject to any disclaimer, the term of this patent is extended or adjusted under 35 U.S.C. 154(b) by 0 days.

(21) Appl. No.: 17/943,187

(22) Filed: Sep. 12, 2022

(65) Prior Publication Data
US 2023/0094604 A1 Mar. 30, 2023

Related U.S. Application Data

(60) Provisional application No. 63/242,612, filed on Sep. 10, 2021.

(51) Int. Cl.
*F03B 13/14* (2006.01)
*F15B 21/0423* (2019.01)

(52) U.S. Cl.
CPC .......... *F03B 13/14* (2013.01); *F15B 21/0423* (2019.01)

(58) Field of Classification Search
CPC ........ F03B 13/14; F03B 13/16; F03B 13/189; F03B 13/20; F15B 21/0423; F15B 2211/611; F15B 2211/62
See application file for complete search history.

(56) References Cited

U.S. PATENT DOCUMENTS

| | | | |
|---|---|---|---|
| 2010/0314871 A1* | 12/2010 | Jean | F03B 13/1855 310/300 |
| 2015/0360274 A1* | 12/2015 | Kohno | B21D 24/14 72/453.13 |
| 2017/0279303 A1* | 9/2017 | Bauer | H02J 3/38 |
| 2018/0045166 A1 | 2/2018 | Mundon et al. | |
| 2018/0073482 A1 | 3/2018 | Sheldon-Coulson et al. | |
| 2019/0360452 A1 | 11/2019 | Qu | |
| 2021/0010452 A1 | 1/2021 | Mundon | |

OTHER PUBLICATIONS

Rodriquez "PCT Written Opinion of the International Searching Authority for International Application No. PCT/US22/43265" dated Dec. 22, 2022, 4 pages.
Rodriquez "PCT International Search Report for International Application No. PCT/US22/43265" dated Dec. 22, 2022, 2 pages.

* cited by examiner

*Primary Examiner* — Abiy Teka
*Assistant Examiner* — Matthew Wiblin
(74) *Attorney, Agent, or Firm* — Intellectual Strategies

(57) ABSTRACT

A wave energy converter (WEC) system includes a float, a drivetrain, a reaction structure coupled to the drivetrain by at least one tendon, and a power dissipation system coupled to the drivetrain. The power dissipation system is configured to manage peak loads in the WEC system by dissipating peak energy spikes caused by relative movement of the reaction structure and the float.

8 Claims, 10 Drawing Sheets

TABLE I
FULL SCALE MODEL RESULTS.

|  | Without Active PDN | With Active PDN |
|---|---|---|
| Mean generator mechanical input power (kW) | 261 | 214 |
| Max generator mechanical input power (kW) | 1514 | 1190 |
| Mean PDN power (kW) | 14.6 | 93.1 |
| Max PDN power (kW) | 501 | 1916 |
| Max speed (rpm) | 3178 | 1963 |
| Cylinder stroke (m) | 3.77 | 3.09 |

POWER DISSIPATION IN WAVE ENERGY CONVERTER SYSTEMS

CROSS-REFERENCE TO RELATED APPLICATIONS

This application claims the benefit of U.S. Provisional Application No. 63/242,612, filed on Sep. 10, 2021, which is incorporated by reference herein in its entirety.

BACKGROUND

This disclosure relates generally to wave energy systems. More specifically, this disclosure relates to power dissipation systems for wave energy systems.

SUMMARY

The subject matter of the present application has been developed in response to the present state of the art, and in particular, in response to the problems and disadvantages associated with conventional deposition that have not yet been fully solved by currently available techniques. Accordingly, the subject matter of the present application has been developed to provide embodiments of a system, an apparatus, and a method that overcome at least some of the shortcomings of prior art techniques.

Disclosed herein is a wave energy converter (WEC) system. The system includes a float, a drivetrain, a reaction structure coupled to the drivetrain by at least one tendon, and a power dissipation system coupled to the drivetrain. The power dissipation system is configured to manage peak loads in the WEC system by dissipating peak energy spikes caused by relative movement of the reaction structure and the float. The preceding subject matter of this paragraph characterizes example 1 of the present disclosure.

The power dissipation system uses a pressure drop to heat a hydraulic fluid. The preceding subject matter of this paragraph characterizes example 2 of the present disclosure, wherein example 2 also includes the subject matter according to example 1, above.

The system further includes a hydraulic system, wherein the hydraulic system is coupled to the drivetrain and wherein the dissipating peak energy spikes comprises generating heat in the hydraulic system. The preceding subject matter of this paragraph characterizes example 3 of the present disclosure, wherein example 3 also includes the subject matter according to any one of examples 1-2, above.

The system further includes a heat exchanger, wherein the heat exchanger removes the heat in the hydraulic system. The preceding subject matter of this paragraph characterizes example 4 of the present disclosure, wherein example 4 also includes the subject matter according to any one of examples 1-3, above.

The hydraulic system comprises a plurality of pipes in series. The preceding subject matter of this paragraph characterizes example 5 of the present disclosure, wherein example 5 also includes the subject matter according to any one of examples 1-4, above.

The plurality of pipes each comprise a corresponding valve configured to individually grant fluid access to each pipe, wherein utilizing less pipes produces more power dissipation and utilizing more pipes produces less power dissipation. The preceding subject matter of this paragraph characterizes example 6 of the present disclosure, wherein example 6 also includes the subject matter according to any one of examples 1-5, above.

The system further includes a controller, wherein the controller is configured to initiate the power dissipation system when parameters are met. The preceding subject matter of this paragraph characterizes example 7 of the present disclosure, wherein example 7 also includes the subject matter according to any one of examples 1-6, above.

The system further includes a hydraulic system and a heat exchanger, wherein the controller is configured to activate the hydraulic system to dissipate heat during the peak energy spikes. The preceding subject matter of this paragraph characterizes example 8 of the present disclosure, wherein example 8 also includes the subject matter according to any one of examples 1-7, above.

The system comprises orifices to cause a pressure drop and generate heat. The preceding subject matter of this paragraph characterizes example 9 of the present disclosure, wherein example 9 also includes the subject matter according to any one of examples 1-8, above.

The system further includes a heat exchanger, wherein the heat exchanger removes the heat from the system. The preceding subject matter of this paragraph characterizes example 10 of the present disclosure, wherein example 10 also includes the subject matter according to any one of examples 1-9, above.

Disclosed herein is a wave energy converter (WEC) system. The system includes a float, a drivetrain, a reaction structure coupled to the drivetrain by at least one tendon, and a power dissipation system coupled to the drivetrain. The power dissipation system power dissipation system is configured to create flow restrictions and pressure drops in the system to dissipate peak energy spikes caused by relative movement of the reaction structure and the float. The preceding subject matter of this paragraph characterizes example 11 of the present disclosure.

The power dissipation system uses a pressure drop to heat a hydraulic fluid. The preceding subject matter of this paragraph characterizes example 12 of the present disclosure, wherein example 12 also includes the subject matter according to example 11, above.

The system further includes a hydraulic system, wherein the hydraulic system is coupled to the drivetrain and wherein the dissipating peak energy spikes comprises generating heat in the hydraulic system. The preceding subject matter of this paragraph characterizes example 13 of the present disclosure, wherein example 13 also includes the subject matter according to any one of examples 11-12, above.

The system further includes a heat exchanger, wherein the heat exchanger removes the heat in the hydraulic system. The preceding subject matter of this paragraph characterizes example 14 of the present disclosure, wherein example 14 also includes the subject matter according to any one of examples 11-13, above.

The hydraulic system comprises a plurality of pipes in series. The preceding subject matter of this paragraph characterizes example 15 of the present disclosure, wherein example 15 also includes the subject matter according to any one of examples 11-14, above.

The plurality of pipes each comprise a corresponding valve configured to individually grant fluid access to each pipe, wherein utilizing less pipes produces more power dissipation and utilizing more pipes produces less power dissipation. The preceding subject matter of this paragraph characterizes example 16 of the present disclosure, wherein example 16 also includes the subject matter according to any one of examples 11-15, above.

The system further includes a controller, wherein the controller is configured to initiate the power dissipation system when parameters are met. The preceding subject matter of this paragraph characterizes example 7 of the present disclosure, wherein example 17 also includes the subject matter according to any one of examples 11-16, above.

The system further includes a hydraulic system and a heat exchanger, wherein the controller is configured to activate the hydraulic system to dissipate heat during the peak energy spikes. The preceding subject matter of this paragraph characterizes example 18 of the present disclosure, wherein example 18 also includes the subject matter according to any one of examples 11-17, above.

The system comprises orifices to cause a pressure drop and generate heat. The preceding subject matter of this paragraph characterizes example 19 of the present disclosure, wherein example 19 also includes the subject matter according to any one of examples 11-18, above.

The system further includes a heat exchanger, wherein the heat exchanger removes the heat from the system. The preceding subject matter of this paragraph characterizes example 20 of the present disclosure, wherein example 20 also includes the subject matter according to any one of examples 11-19, above.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

Throughout the description, similar reference numbers may be used to identify similar elements.

DETAILED DESCRIPTION

Figure 1:
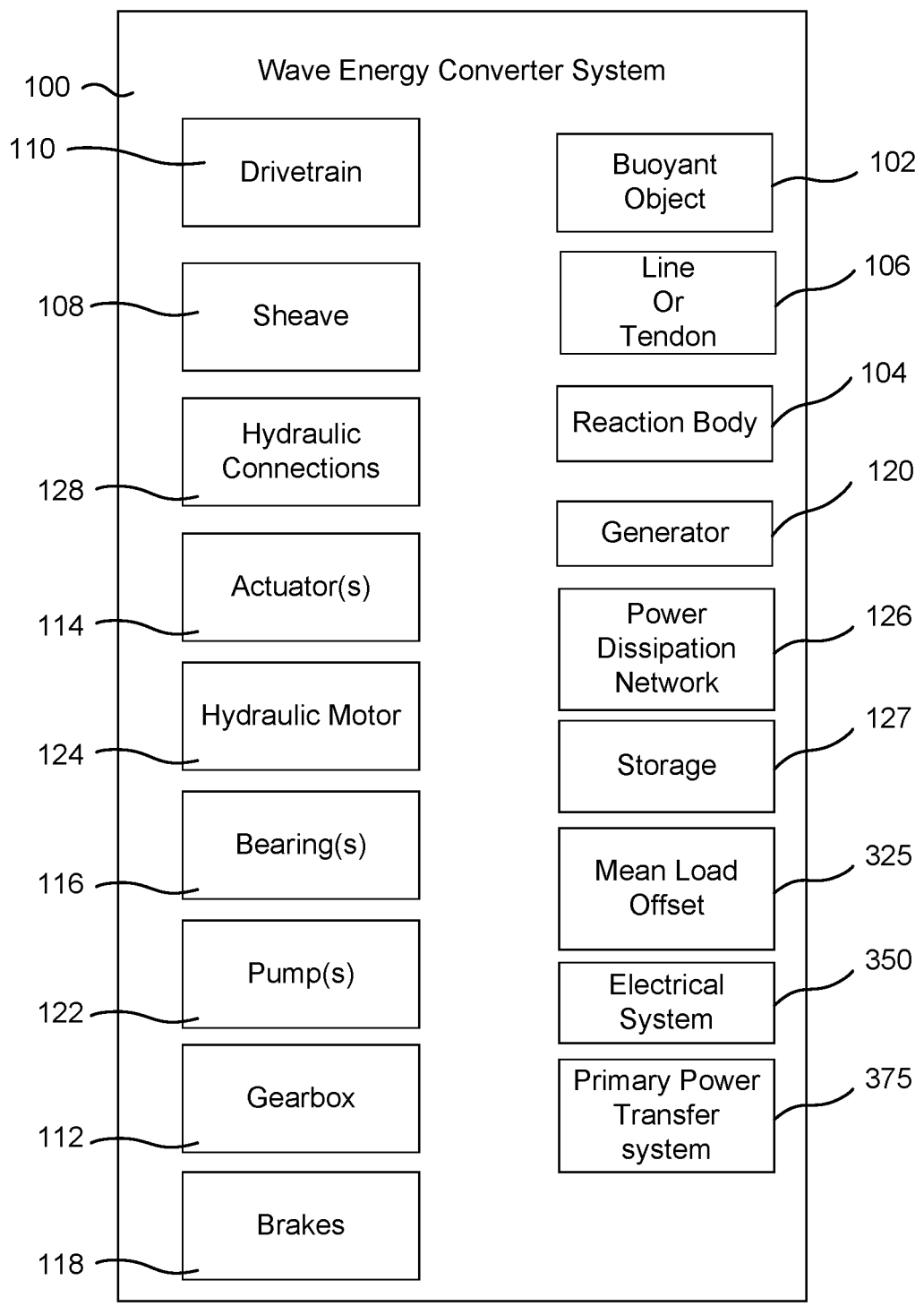
FIG. 1 is a schematic diagram illustrating an embodiment of a WEC system for a wave energy converter in accordance with one or more embodiments of the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Wave Energy Converters (WEC) are subject to very large differences in incident wave power. This variability is a key challenge for the design of efficient and cost-effective systems. A typical ocean environment considered for deployment of a wave energy device, such as PMEC in Oregon, USA, will typically experience a 100 year extreme wave that has 67 times the annual average power. Most wave energy devices have a survival mechanism to handle these extremes. However, even within a single sea state of normal operating conditions, the peak to average ratio of incident energy is still in the region of 10:1. If no intermediate power dissipation or smoothing is applied, this incident wave power will be translated through the WEC to electrical power. If this high variability is transferred to the electrical generator, this will be challenging to maintain an efficient and low-cost electrical system. For example, a WEC that is expected to output an average power of 100 kW in a given design sea state, would need to be designed for a peak electrical power of at least 1MW. Some of this over-design can be accommodated within manufacturers margins, especially given that peak powers are typically only experienced for very short durations, however these margins are seldom more than a factor of 2, meaning that the generator and power electronics will inevitably need to be sized much greater than the expected output. In such circumstances, the mean velocities will tend to be significantly lower than the peak, resulting in poor operating efficiency. The end effect is that variability becomes a significant driver for the cost and weight of the generator, which is compounded with direct drive approaches. It has been suggested that the PTO peak power can be limited to less than 20 times the average. However, in practice, arbitrarily limiting the peak power of the generator has several impractical consequences, discussed below. This disclosure presents an approach that significantly reduces the peak to average mechanical energy seen by the WEC electrical power conversion system. The approach uses a 'peak-shaving' technique to turn peaks of mechanical energy into heat which can then be dissipated. The system described here is specific to a hydraulic PTO, but not necessarily specific to any particular system.

The approach described here has been developed for the WEC shown in FIG. 1. The WEC may be, in some embodiments, a two-body, multi-mode, point absorber comprising a hydrodynamically optimized surface float and ring-shaped reaction structure. Three tendons connect the surface float to the reaction structure. When exited by waves, the system has a parametric response across multiple modes of motion. Each tendon is connected to an independent drivetrain. The Power Take Off of the Triton WEC comprises of three independent drivetrains that are based around a somewhat conventional hydraulic architecture. High pressure fluid is developed in pistons connected to the prime mover (in this case, between the tendon and float) which then drives hydraulic motors each coupled to rotary electrical generators. In some embodiments, 'PTO' encompasses all systems supporting the power generation. In some embodiments, 'drivetrain' refers to the mechanical and hydraulic system, up to the output of the electrical generator.

FIG. 1 is a schematic diagram illustrating one embodiment of a wave energy converter (WEC) system 100 in accordance with some embodiments of the present invention. Although the WEC system 100 is shown and described with certain components and functionality, other embodiments of the WEC system 100 may include fewer or more components to implement less or more functionality. Although many of the components are depicted as coupled to the buoyant object 102, in other embodiments, the components are within an enclosure along the line or tendon 106 or at the reaction body 104.

The WEC system 100 includes a buoyant object 102 and a reaction body 104 coupled together with a line or tendon 106. The buoyant object 102 is a surface float or a near surface float that moves or floats near or on the surface of a body of water. The buoyant object 102 moves with the waves of the body of water. As the buoyant object 102 oscillates on the surface of the body of water, the buoyant object 102 will move relative to the reaction body 104. The relative motion between the buoyant object 102 and the reaction body 104 creates tension and forces on the line or tendon 106. The forces from the relative motion are captured as is described more fully herein as well as in the references incorporated herein.

The buoyant object 102 is a buoy, buoy housing, float, or surface float that is configured to float at the surface or near the surface of the body of water. The buoyant object 102 may be an enclosure shaped to house the various components described herein. The buoyant object 102 may include various seals or other structural components to isolate an interior chamber that houses the various components.

The reaction body 104 may be any structure configured to be submerged in the body of water. In some embodiments, the reaction body 104 is an anchor attached to the sea floor. In some embodiments, the reaction body 104 is a heave plate or other structure that restricts movement in the water. In some embodiments, the reaction body 104 is the sea floor. As the buoyant object 102 oscillates on the surface of the body of water, the reaction body 104 will counteract such motion which will exert forces on the line or tendon 106.

The line or tendon 106 may be any type of cord, chain, rope, cable, etc. that is configured to couple the buoyant object 102 to the reaction body 104. Although only one line or tendon 106 is described in many embodiments herein, the WEC system 100 may include a plurality of tendons 106 which couple the buoyant object 102 to the reaction body 104. In some embodiments, the line or tendon 106 is configured to attach to a sheave 108 or other structural component on the buoyant object 102. In some embodiments, the sheave 108 may be within an interior chamber of the buoyant object 102 through a sealed entry point. In some embodiments, the line or tendon 106 is configured to attach to a sheave 108 or other structural component outside the buoyant object 102 with the sheave 108 or structural component configured to enter the interior chamber of the buoyant object 102 through the sealed entry point. While the sheave 108 is described as coupled to the buoyant object 102 in many embodiments described herein, in some embodiments, the sheave 108 may be coupled to the reaction body 104.

The WEC system 100 further includes a drivetrain 110. The drivetrain 110 is configured to receive an input force generated by the relative movement of the buoyant object 102 and the reaction body 104. Although the drivetrain 110 is shown and described with certain components and functionality, other embodiments of the drivetrain 110 may include fewer or more components to implement less or more functionality.

In some embodiments, the drivetrain 110 or drivetrain system may include various components. In some embodiments, the drivetrain 110 may include the sheave 108, a gearbox system 112, and actuator(s) 114. The drivetrain 110 may further be associated with various bearings 116, brakes 118, generator(s) 120, pumps 122, hydraulic motor 124, power dissipation network 126, energy storage 127, and hydraulics 128. Embodiments described herein may or may not include all these components.

Referring to FIG. 1, the drivetrain 110 may include various components including pumps 122, hydraulic connections 128, bearings 116, gearboxes 112, brakes 118, actuators 114, or hydraulic motors 124 to drive a generator 120.

Disclosed herein is a wave energy converter (WEC) system. The system includes a float, a drivetrain, a reaction structure coupled to the drivetrain by at least one tendon, and a power dissipation system coupled to the drivetrain. The power dissipation system is configured to manage peak loads in the WEC system by dissipating peak energy spikes caused by relative movement of the reaction structure and the float.

In some embodiments, the power dissipation system uses a pressure drop to heat a hydraulic fluid. In some embodiments, the system further includes a hydraulic system, wherein the hydraulic system is coupled to the drivetrain and wherein the dissipating peak energy spikes comprises generating heat in the hydraulic system. In some embodiments, the system further includes a heat exchanger, wherein the heat exchanger removes the heat in the hydraulic system. In some embodiments, the hydraulic system comprises a plurality of pipes in series.

In some embodiments, the plurality of pipes each comprise a corresponding valve configured to individually grant fluid access to each pipe, wherein utilizing less pipes produces more power dissipation and utilizing more pipes produces less power dissipation. In some embodiments, the system further includes a controller, wherein the controller is configured to initiate the power dissipation system when parameters are met.

In some embodiments, the system further includes a hydraulic system and a heat exchanger, wherein the controller is configured to activate the hydraulic system to dissipate heat during the peak energy spikes. In some embodiments, the system comprises orifices to cause a pressure drop and generate heat. In some embodiments, the system further includes a heat exchanger, wherein the heat exchanger removes the heat from the system.

Figure 2A:
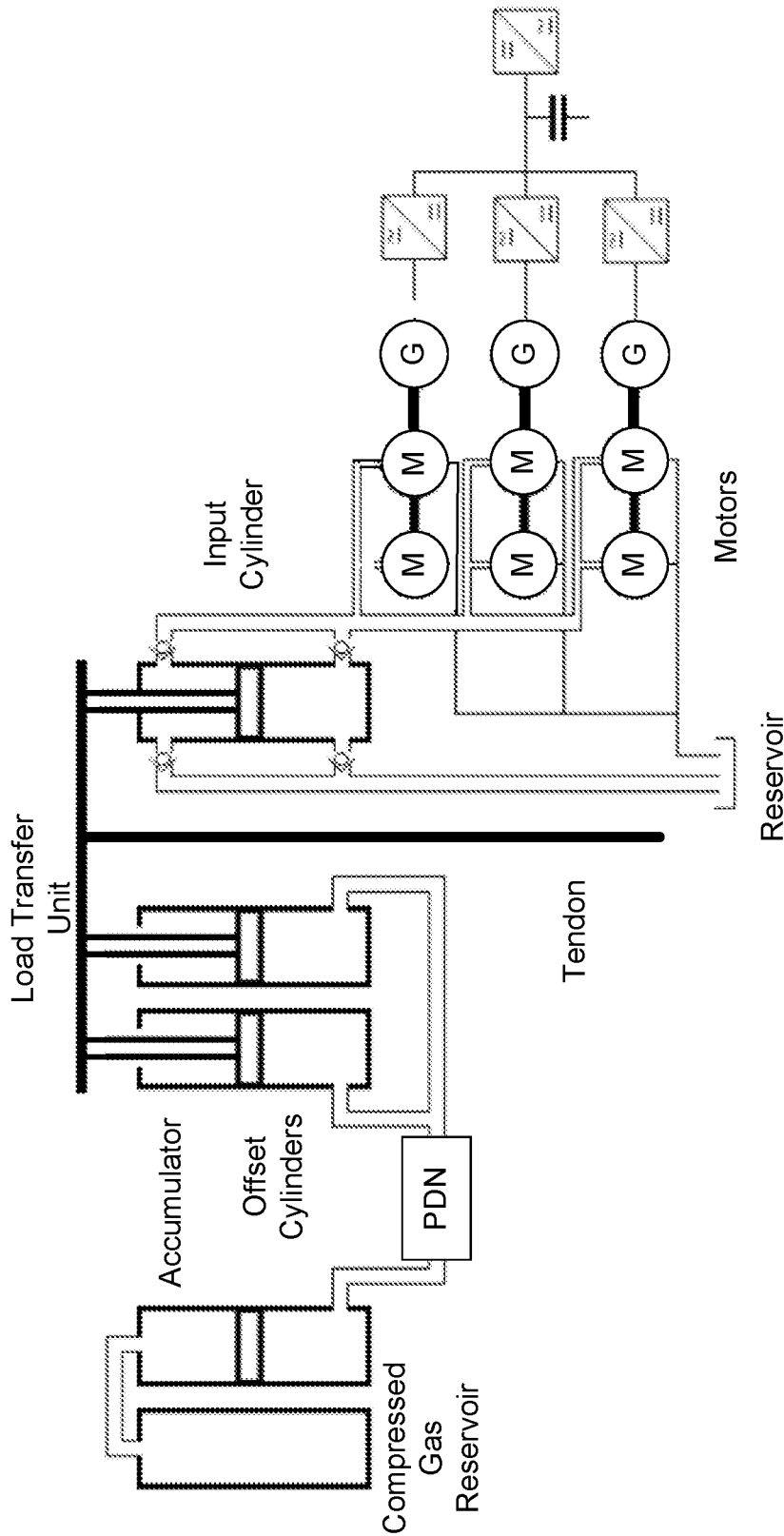
FIG. 2A is a schematic diagram illustrating an embodiment of a WEC system for a wave energy converter.

A schematic diagram of a single drivetrain is shown in FIG. 2A. Some embodiments include the following major subsystems.

Figure 2B:
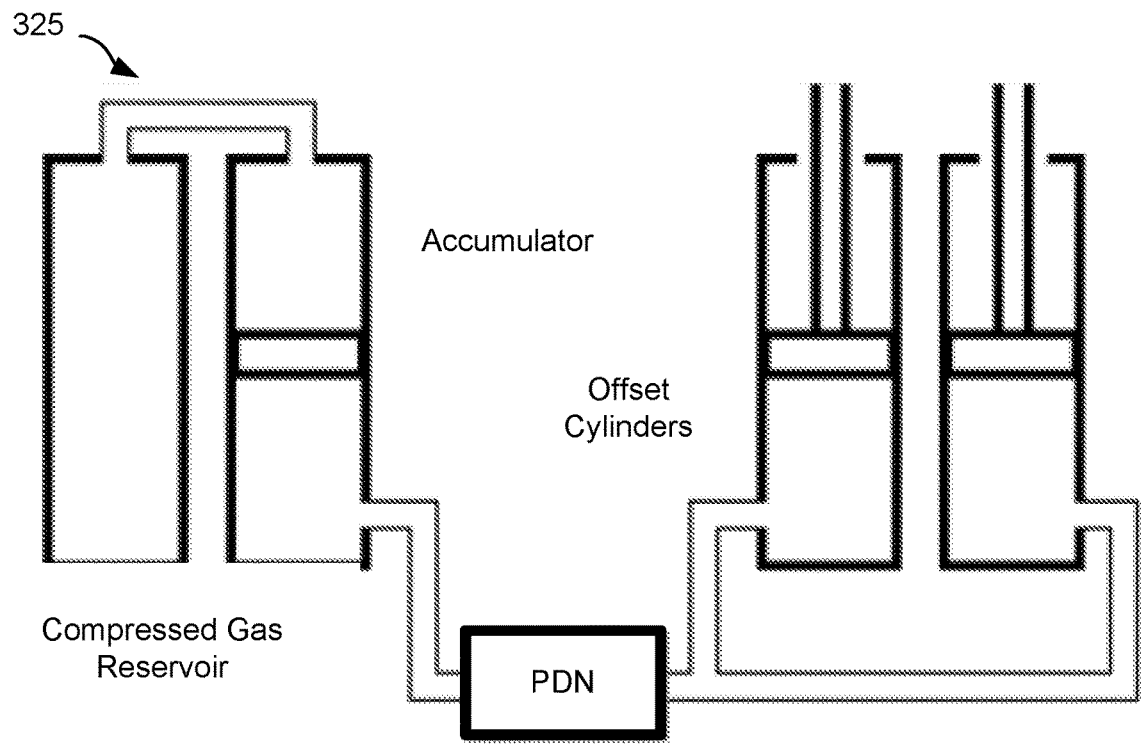
FIG. 2B is a schematic diagram illustrating an embodiment of the mean load offset of a WEC system for a wave energy converter.

1) The Mean Load Offset (MLO) system 325 (See FIG. 2B also), which provides a force to support the weight of the reaction ring and provide a restoring force to the equilibrium position.

2) The Power Dissipation Network (PDN), located within the MLO system, prevents excessive motion of the tendons and limits the power that is transmitted to the generators when needed.

Figure 2C:
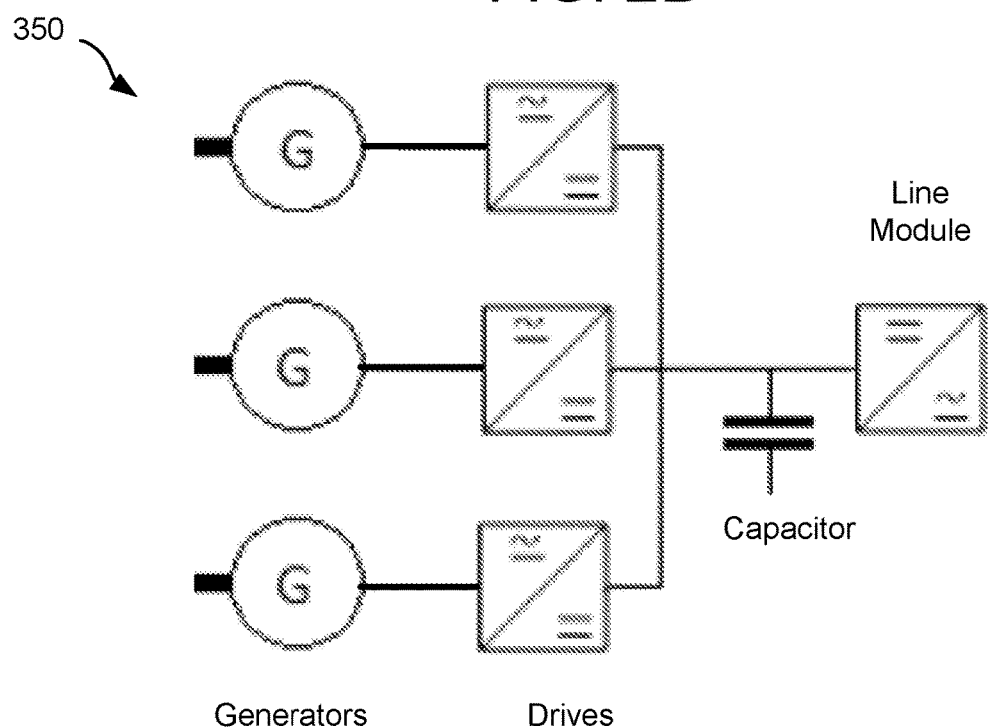
FIG. 2C is a schematic diagram illustrating an embodiment of the electrical system of a WEC system for a wave energy converter.
Figure 2D:
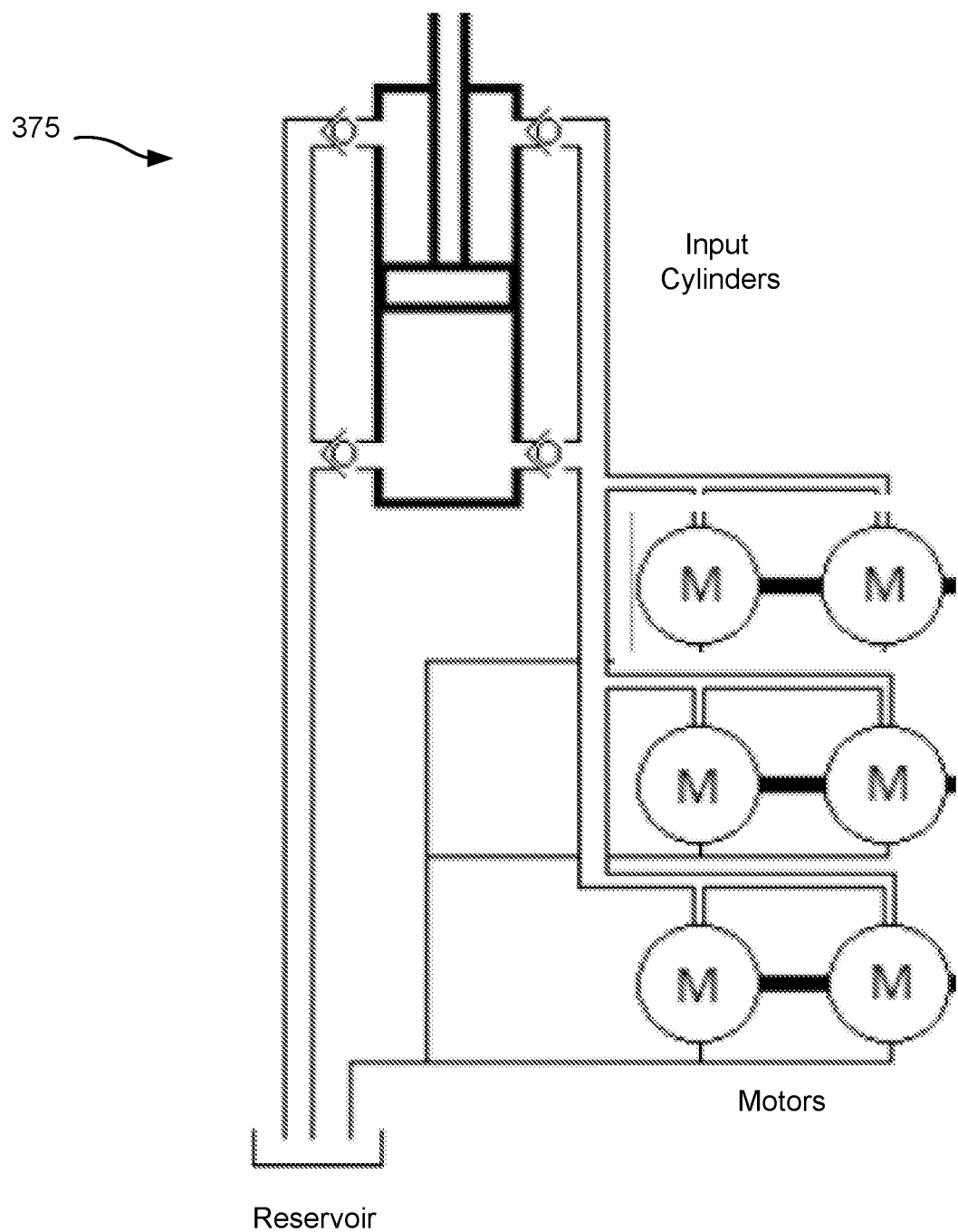
FIG. 2D is a schematic diagram illustrating an embodiment of the power transfer system of a WEC system for a wave energy converter.

3) The Primary Power Transfer (PPT) system 375 (See FIG. 2D also), which transfers the power from the tendons to the generators.

4) The Electrical system 350 (See FIG. 2C also), which transforms the mechanical power at the generator shafts into electricity that can be sent to the grid.

The WEC, in some embodiments, uses hydraulic cylinders as the primary mechanical input to each drivetrain. There are many advantages of using this approach. However, for such approaches, the cost per meter of PTO travel may be high and it is therefore important to utilize the stroke as efficiently as possible. This means that it becomes particularly important to control the PTO force at peak velocities so as not to exceed the allowable travel. It should be noted that while end-stop events are an inevitable consequence of these types of linear input PTO, it is not wise to design with the expectation that they will be used, but rather employed only as a safety mechanism in the event that predicted quantities are exceeded.

With the exception of advanced control approaches and assuming linear theory applies, a wave energy device will experience maximum power when the apparent PTO force increases linearly with velocity. The gradient of this relationship defines what is known as the damping value and there will be an optimum value that produces maximum power for any given sea state. However, maintaining this damping value through the full range of velocities experienced is challenging and will require high forces. The designer is then left with the challenge of either selecting a generator/PTO that can provide the high forces associated with the peak velocities, or accept that at the highest velocities, the desired damping will not be reached. The latter is the obvious choice, as otherwise the PTO will be substantially oversized for the nominal case, which would be quite inefficient. The consequence of this is that when the generator torque limit is reached, the velocity will increase and the PTO stroke will increase. These effects can be challenging to accommodate even in the simplest, winch-based PTO's.

Events that require high forces in the PTO are infrequent, and if we consider a typical design sea state, we can see that the energy content of these large events is only a small fraction of the average captured energy. As such, it is perhaps wise to consider 'wasting' this energy at the expense of reducing overall system size and cost. This 'peak shaving' mechanism is discussed here and implemented hydraulically, providing additional damping force that can be added to the generator to help improve system dynamic control and limit the required generator size. We term this the Power Dissipation Network. It is a hydraulic network that limits the power that is transmitted to the electrical system when excessive power is absorbed from the waves. Power that is absorbed by the WEC is converted to electricity through multiple stages and in each part of the conversion process it is more or less feasible and cost effective to remove excess power. The power conversion steps in the Triton are:

1) Wave to mechanical. Part of the power in the waves that interact with the WEC is transformed into mechanical power of moving PTO cylinders.

2) Mechanical to hydraulic. The motion of the PTO cylinders is converted into flow and pressure in the hydraulic systems (MLO and PPT).

3) Hydraulic to mechanical. The pressure and flow of the hydraulic fluid in the PPT are converted into torque and rotation of the generator drive shaft.

4) Mechanical to electrical. The shaft torque and rotation are converted into current and voltage.

To limit power absorption at the first stage, the hydrodynamic behavior of the device would need to be altered. It is suggested that these changes can be made on a sea-by-sea basis, with the required physical changes completed in the order of hours, however it would appear to be impractical to use this approach on a wave-by-wave basis. Non-linear hydrodynamics in some WEC archetypes may provide some power limiting for higher events within a given sea state, reducing the peak to average ratio.

Dissipating excess power in the mechanical stage is possible and the approach may be to use friction (through brakes or similar approach) to convert some of the mechanical energy into heat. Some embodiments utilize this approach. However, while simple, there is some inevitable wear on these components which introduces a new maintenance challenge. Furthermore, for WEC's in the MW range, it is difficult to find mechanical parts that can produce the required breaking force & power dissipation in the very short time scales (less than or equal to 0.1 s) required.

Smoothing power at the electrical stage is eminently possible, but still requires that the generator and electric drives be sized so they can cope with the peak mechanical power supplied to it. This means the generator, which is often an expensive and large component of the PTO, is oversized for the average power it needs to convert. In turn this also typically reduces the conversion efficiency in the low-to-mid power range where a significant part of the annual average energy is produced. In general, it is desirable to limit the size of the electrical system as much as possible.

Figure 3:
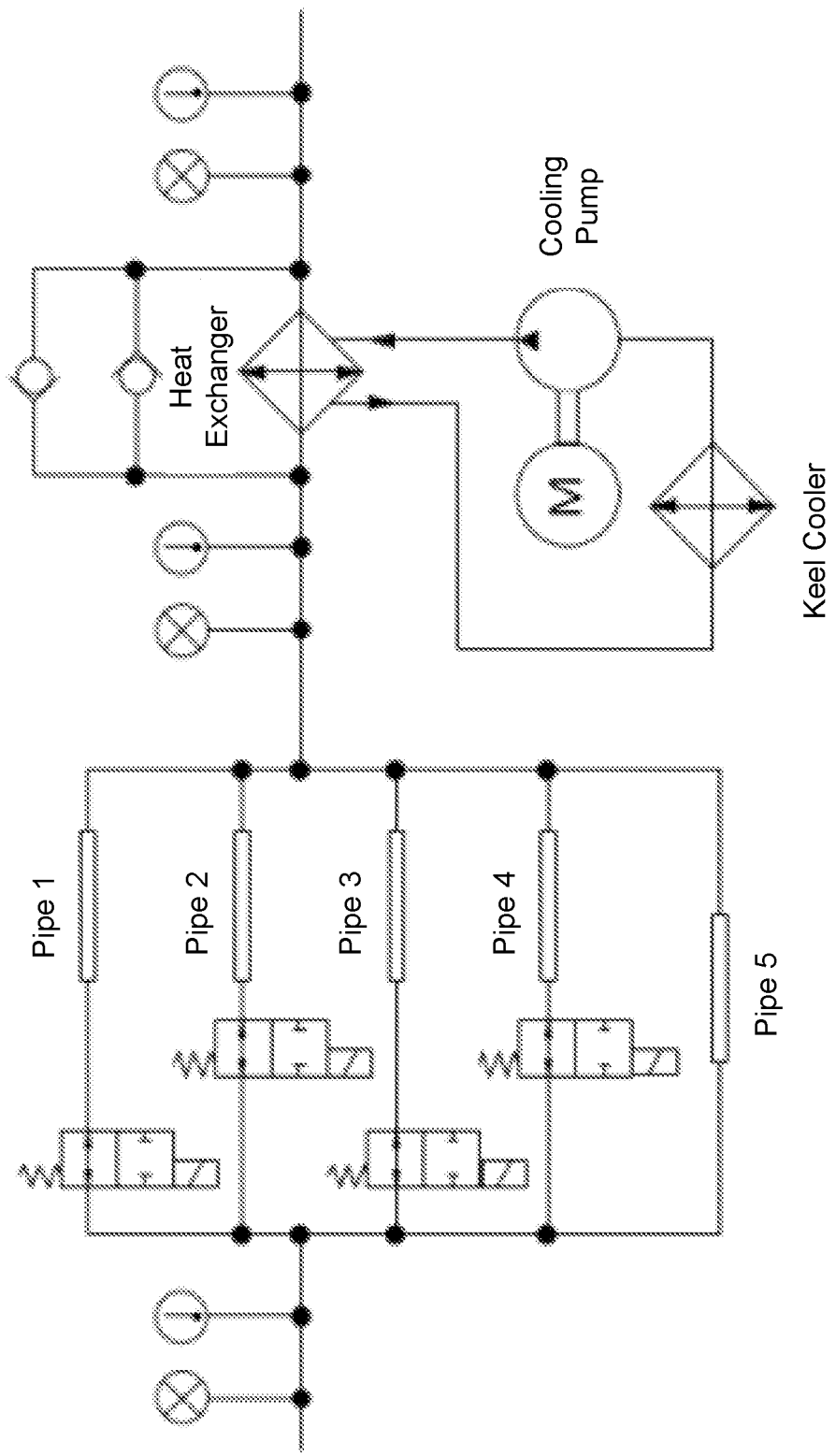
FIG. 3 is a schematic diagram illustrating an embodiment of the power dissipation network of a WEC system for a wave energy converter.

As shown in FIG. 2, the WEC utilizes a hydraulic PTO and uses hydraulic fluid to transfer energy from the mechanical system to the electrical. This hydraulic transmission has a very high power-density, the hydraulic fluid provides a large temporary heat store where increased temperatures do not immediately have a detrimental effect on components, generated heat can be removed relatively easily through heat exchangers and control of hydraulic components can be performed on very short time scales. For these reasons it is considered a suitable subsystem to remove large power peaks in very short time frames. The Triton uses what we term a 'Power Dissipation Network' (PDN), implemented within the hydraulic system. The PDN is shown in FIG. 3 and is a simple arrangement of four 2/2 (shut-off) valves, five pieces of pipe and a heat exchanger. The valves are open under normal operation and the pipes have sufficiently low resistance to typical operational flows that power loss is minimal. The PDN control system continuously monitors system behavior. When conditions are identified that could lead to the stroke limit of the cylinders or the maximum input power to the generators being exceeded, the controller shuts the valves one by one. This reduces the flow area and increases the resistance to flow. The resulting pressure drop heats up the hydraulic fluid in the system. This heat is then removed from the fluid in the heat exchanger. This effectively represents a power loss to the system, reducing the power that goes to the generators and braking the motion of the cylinders.

The approach that is taken in some embodiments, to intentionally create flow restrictions and therefore pressure drops and power losses, is the exact opposite of what is normally tried to be achieved in the design of hydraulic systems. This means there are no examples of similar applications in more established power hydraulics. There is also no reference in literature to a similar approach to targeted power capping or motion limiting in wave energy devices, or any other devices. The results from numerical and physical modeling provide the first insight into whether this type of approach is a viable method of reducing component sizes, improving power quality, and increasing system safety by avoiding exceeding limits.

In some embodiments, the PDN is placed in the MLO rather than the PPT because the flow rates are higher in the MLO system. This means a smaller pressure drop is required to provide the same level of power dissipation. Additionally, the pressure in the MLO system is in phase with the tendon displacement, whereas the pressure in the PPT system is in phase with the tendon velocity. The pressure drop created by the PDN is also in phase with tendon velocity and therefore having the PDN in the MLO system staggers the pressure maximums, whereas in the PPT system they would occur at the same time and therefore add up to higher extremes. This means the PDN can be integrated in the MLO without the need for increased design pressure.

Creating a pressure drop in the PDN can cause erosion of hydraulic components, however the deterioration due to erosion is a lot smaller than for equivalent mechanical damping, especially when hardwearing surfaces are used in the pipes and valves of the PDN and the hydraulic fluid is kept clean through filtration. Using pipes instead of orifices to provide the pressure drop also ensures that the hydraulic friction is generated over a relatively large surface area, thereby avoiding highly localized wear areas. Furthermore, the fluid in the MLO is water/glycol which has a large heat capacity, preventing fast warming and therefore potential deterioration of the fluid. The PDN is also only going to be used intermittently, allowing the fluid to cool off in between activations. The power requirements for the cooling pump are always small compared to the power generated by the system. The flow rate required on the cold side of the heat exchanger can be calculated by Equation (1):

$$\dot{m} = \frac{\dot{Q}}{C_p(T_o - T_i)}$$

Where
$\dot{m}$—mass flow rate
$\dot{Q}$-heat flow rate (power) to be removed
$C_p$— specific heat
$T_o$—outlet temperature
$T_i$—inlet temperature.

If, for example, a very high average dissipated power of 100 kW needs to be removed, a mass flow rate of 5 kg/s is required (assuming water/glycol 85/15 with $C_p$=4 kJ/(kg K), $T_i$=35 degrees C. and $T_o$=40 degrees C.). Since the density of the water/glycol is close to 1000 kg/m3, the volume flow rate is 0.005 m³/s. From discussions with heat exchanger manufacturers a maximum pressure drop of 1 bar for this flow was obtained. The power required to pump the cooling fluid through the heat exchanger is therefore only 500 W. Assuming additional pressure drops in the cooling system pipe work and keel cooler of 5 bar increases the cooling pump power to 3 kW. In a sea state where 100 kW is dissipated in the PDN, this will always be very small compared to the generated power.

A model for a full-scale drivetrain was implemented in Mathworks Simscape Fluids. The model covers everything from the Load Transfer Unit (LTU), that drives both the MLO and PPT cylinders, to the electrical generator. Because the drivetrains of each of the three tendons are hydraulically and electrically isolated from the other two, only a single drivetrain was modeled. The tendon force that acts on the LTU is used as the input force for the drivetrain model. This force, for all three tendons, was obtained from simulations of the WEC in Orcina OrcaFlex. This model was validated from a range of physical model tests. The code solves for the multibody dynamics of the coupled marine and PTO system, using the hydrodynamic coefficients derived from a frequency domain boundary element method (BEM) solver. For the surface float, the frequency-dependent added mass, damping and linearized excitation forces were computed using the BEM solver NEMOH. The line dynamics for the tendons and moorings were solved in OrcaFlex using lumped mass finite-elements, and the PTOs were modelled by three spring-damper elements connected between the surface float and the top of each tendon. The spring and damping components were defined using nonlinear force profiles from equivalent Simscape components that were characteristic of the MLO accumulators and the electrical generators, respectively.

Figure 4:
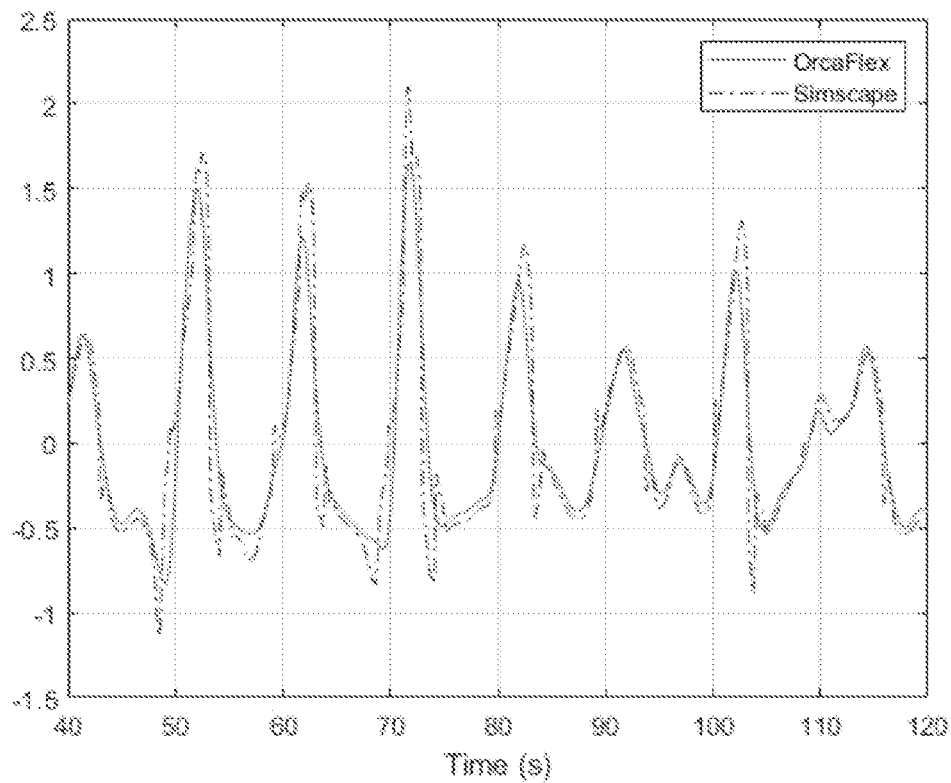
FIG. 4 is a graph of comparing tendon velocity.

The separation of the hydrodynamic and drivetrain models means there is no feedback between the two models. Care must therefore be taken that the characteristics of the drivetrain model are well represented in the hydrodynamic model to ensure the WEC and tendon dynamics are modelled accurately. This was verified by comparing the tendon displacement in both models, which should be identical. FIG. 4 shows this comparison for a large sea state and while the comparison is not perfect, the time traces are sufficiently similar to assume the full WEC dynamics are not significantly impacted by the simplified PTO representation in the OrcaFlex model.

A fully coupled model of the hydrodynamics of the device and the hydraulic PTO using ProteusDS software was also developed, but simulations with this approach are significantly slower to run. The comparison of tendon dynamics results from the Simscape and OrcaFlex models suggest that the feedback between the models is nevertheless accurately represented and therefore the coupled model was not required for this exercise, allowing a larger number of runs to be executed.

For development of the hydraulic model, off-the shelf components were researched, and the most suitable parts were chosen. For these parts, data sheets were obtained so that realistic values are used in the model. Furthermore, the following delays were applied to provide a realistic representation of the physical system:

- a measurement delay of 20 ms for every measured signal that is used in the control systems
- a control delay of 20 ms for every control action sent to the generator (torque to be applied) and the hydraulic motor (swash plate angle)
- a closing time of 100 ms for the PDN valves
- an opening time of 200 ms for the PDN valves All major pipework and valves between components were included in the model too.

1) Control of PTO: Control of the motor is aimed at retaining a relatively constant speed. The control is based on the measured cylinder velocity, system pressure and generator speed. These inputs are used to control the swash plate angle of the motor, thereby controlling the displacement continuously. To ensure that the hydraulic motors and electric generators operate near their optimal efficiency, they typically have to run at a speed between 1000-2000 rpm and ideally the speed should stay as constant as possible. To achieve this with the fluctuating incoming flow, the displacement of the motors must be adjusted continuously. Speed is calculated as flow over displacement, so when the flow increases, the displacement needs to increase by the same factor to keep the speed constant.

There are two ways by which the displacement can be varied. Firstly, by changing the number of motors in the circuit. Secondly, the displacement of the individual motors can be varied through control of the swashplate. The multiple sets of two motors and one generator on a single shaft allows for flexibility in the amount of power conversion capacity, allowing efficiency to be maximized. In large sea states, where the flow is high and a lot of power will be converted to electricity, all motors will be operational. However, in smaller sea states with lower tendon velocity, the flow from the input cylinder will be significantly smaller and therefore it would be more efficient to run only one or two motors with a single generator, keeping the motors and generators running close to optimal speed and load.

In variable displacement motors there is a swashplate whose angle is adjusted to adjust the displacement of the motor. A larger angle means a larger displacement, which means a lower speed for a given flow. Hence, as the flow increases, the displacement is increased to maintain the same speed of rotation. This swash plate angle can be controlled and adjusted continuously based on an external input. In the numerical model, the desired system speed can be given as an input and the required swash angle calculated based on the velocity of the input cylinder and speed of the hydraulic motors.

$$\text{swash} = \frac{Q}{nm \cdot D_{max} \cdot \omega_{set}} + \left(1 - \frac{v \cdot \mathcal{P}_{max}}{v_{max} \cdot \mathcal{P}}\right) \quad \text{Equation (2)}$$

Where
swash—fraction of full displacement
Q— flow
nm—number of motors
Dmax—maximum displacement
$\omega_{set}$—rotational speed
v—cylinder velocity
P— pressure The flow is calculated as the cylinder velocity times the relevant (bore or annulus) piston area. The first part of Equation 2 sets the swashplate angle so that the fixed, set motor speed is obtained under changing flow. The second part of the equation adds an adjustment that aims to keep the cylinder velocity and system pressure within set limits. The magnitude of the damping torque that is applied by the generator is calculated based on the input cylinder velocity and the set damping coefficient for the tendon (in NOms1). The force required at each moment is the tendon velocity times the coefficient. This force is generated through a pressure in the hydraulic system, which is calculated as force divided by piston area. Knowing the required pressure, the torque that needs to be applied to the hydraulic motors is calculated by multiplying the pressure by the displacement of the motor. This displacement changes continuously as discussed above, so the instantaneous displacement must be used.

$$P_{req} = \frac{B \cdot |v|}{A} \quad \text{Equation (3)}$$

$$\tau = P_{req} \cdot D + \left(1 - \frac{P}{P_{req}}\right) \quad \text{Equation (4)}$$

Where
P_req—required pressure
B—damping coefficient
A—Eff. cylinder piston area (bore or annulus)
τ—torque
D— displacement To regulate the motor speed to stay around the desired level, the torque is then increased above the calculated magnitude if the speed is too high and decreased if the speed is too low. The torque that is calculated in this way is sent to the generators as the control signal.

It is impossible to keep the motor speed completely constant or apply the linear damping coefficient at the tendon perfectly due to a number of reasons like fluid compressibility, response times in the system and pressure and displacement limits. However, the control described above successfully keeps speed within an acceptable range and the damping at the tendon approaches a linear damping profile.

2) Control of PDN: Control of the PDN valves regulates when a pressure drop is generated, as well as the magnitude of this pressure drop. The main aim of the PDN control is to prevent the cylinders exceeding their stroke limits and to prevent excessive power being transferred to the motor/generators. The valves are closed sequentially when required to reduce the open flow area between offset cylinders and accumulator. The reduced passage induces a pressure drop in the flow path and therefore a conversion from hydraulic power to heat. This process dissipates excess power out of the system.

To achieve the required pressure drop at the right time, the displacement and velocity of the cylinders and the speed of the generators are continuously monitored. This information is used to control the PDN valves individually. The control parameters can be tweaked to open and close the valves at different times depending on the incoming sea state.

Control of the PDN valves is primarily based on comparing cylinder motion to set threshold values, but it also takes into account the speed of the motor/generators. If the generator speed becomes too high, this can be mitigated by limiting the flow in the PPT by applying more damping in the PDN. This coupling of the controls of the PTO and the PDN adds complexity to the system, but in other embodiments it will also allow further integration involving swashplate angle, generator torque and PDN valves closure to optimize both the power conversion efficiency and system protection through smart variable damping in the PPT and MLO simultaneously. The OrcaFlex model was run with a long-crested Bretschneider sea with $T_z$ 8.5 s and $H_s$ 4.75 m, traveling in the head-on direction of the WEC. Time traces of tension of all 3 tendons were recorded and used as input for the Simscape model. This model was run with an active PDN providing additional damping and with a PDN that was kept fully open for comparison.

Figure 5:
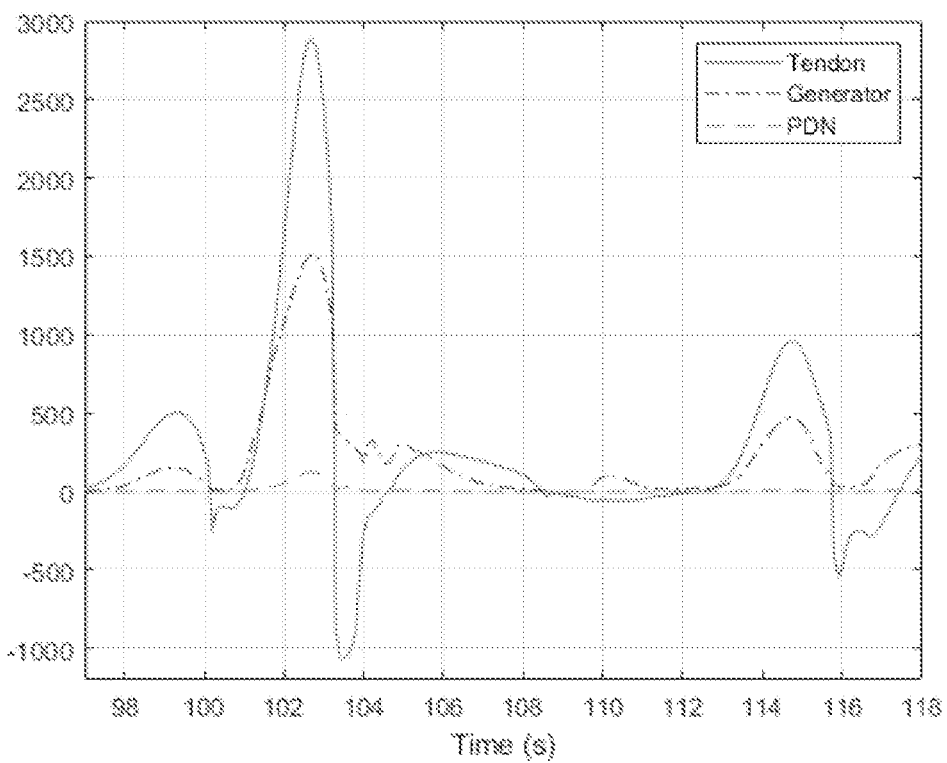
FIG. 5 is a graph of power distribution in kW without an active power dissipation network.

FIG. 5 shows the power distribution in the system without an active PDN. The PDN hardware is present, but all valves remain open. The PDN pipes form a slight flow restriction even when the valves are open, therefore there is a small power loss in the PDN during very large flow events. The tendon input power is calculated as the tendon tension minus the ring weight times the tendon velocity.

$$P_t = (F_t - F_r) \cdot v_t \qquad \text{Equation (5)}$$

Where
$P_t$—tendon input power
$F_t$—tendon tension
$F_r$—ring weight
$v_t$—tendon velocity This power is split over the MLO and the PPT. Because the MLO is part of this split, the total tendon power can be negative when some of the stored energy is returned to the tendon. The power that is transmitted to the PPT is converted into mechanical power at the generator shaft, taking into account the speeding up and slowing down of the flywheels and a small loss due to hydraulic motor efficiencies.

$$P_g = \omega \cdot T_g \qquad \text{Equation (6)}$$

Where
$P_g$—generator mechanical power
$\omega$—generator speed
$T_g$—generator torque The power at the tendon peaks at 2900 kW, with the generator power peaking at 1500 kW.

Figure 6:
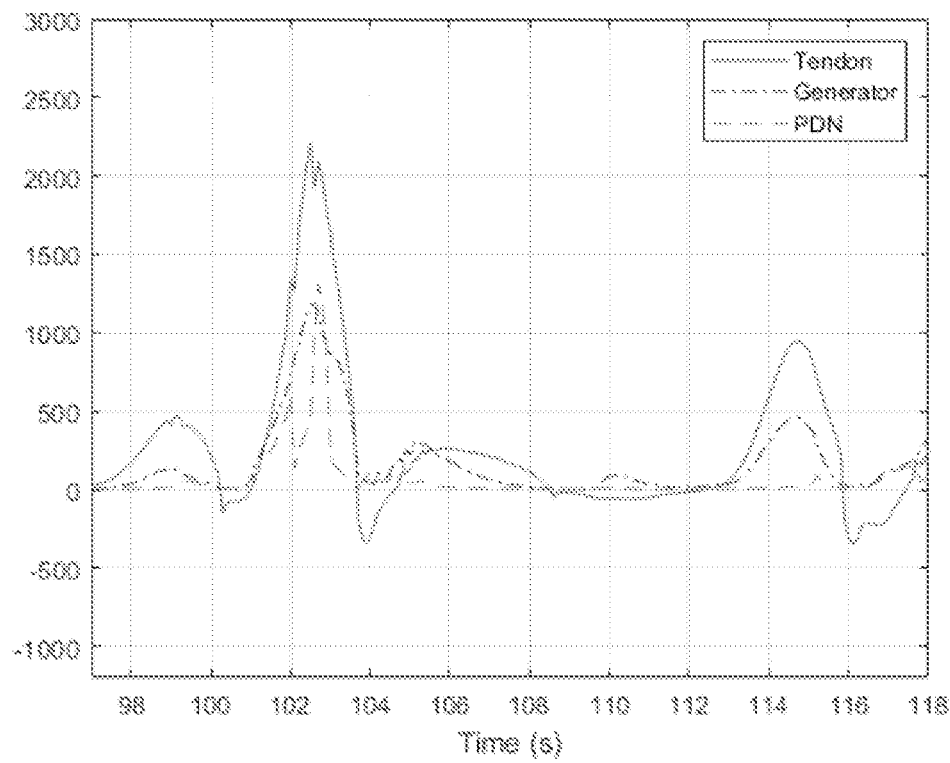
FIG. 6 is a graph of power distribution in kW with an active power dissipation network.
Figure 7:
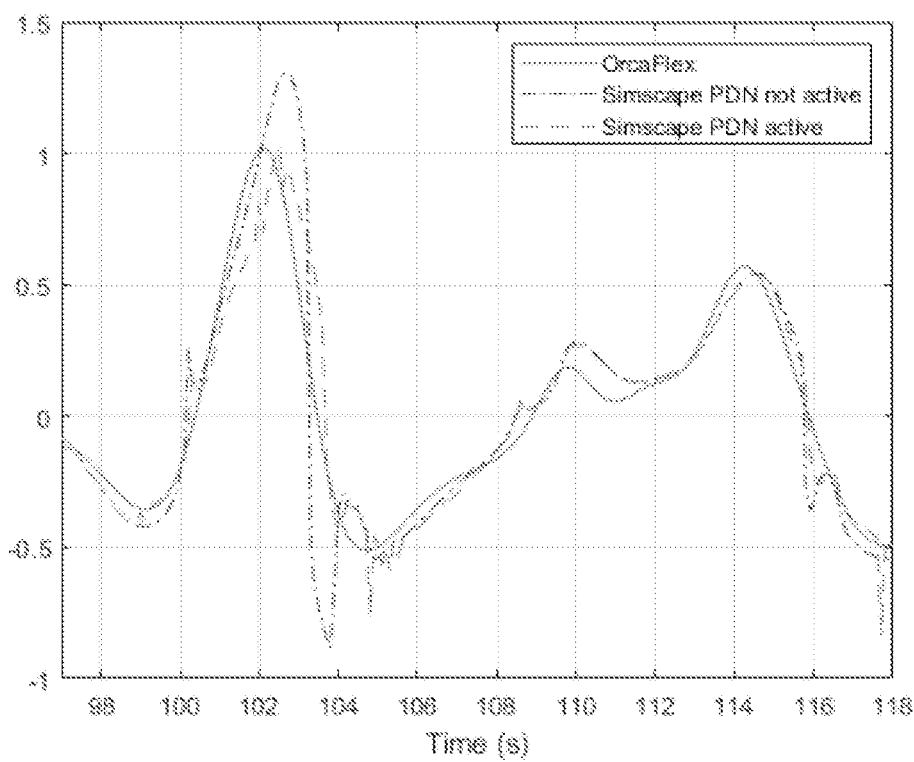
FIG. 7 is a graph of comparing tendon velocity with a same tendon force.

FIG. 6 shows the power distribution for the exact same tendon input force obtained from hydrodynamic simulations. The peak input power from the tendon is significantly reduced to 2200 kW, which is due to the reduced motion shown below in FIG. 7. Consequently, the power transmitted to the PPT is also reduced and the generator power peaks at 1200 kW. This represents a reduction of 20% in power transmitted to the generator. Additional tweaking of PDN control settings can increase this reduction. The additional damping that is provided by the PDN is clearly seen in the power that is converted in the PDN. FIG. 7 shows the bow tendon velocity calculated in OrcaFlex and Simscape with and without active PDN. The force on the tendon is the same for all 3 simulations. The reduction in velocity due to the PDN is clearly visible.

Figure 8:
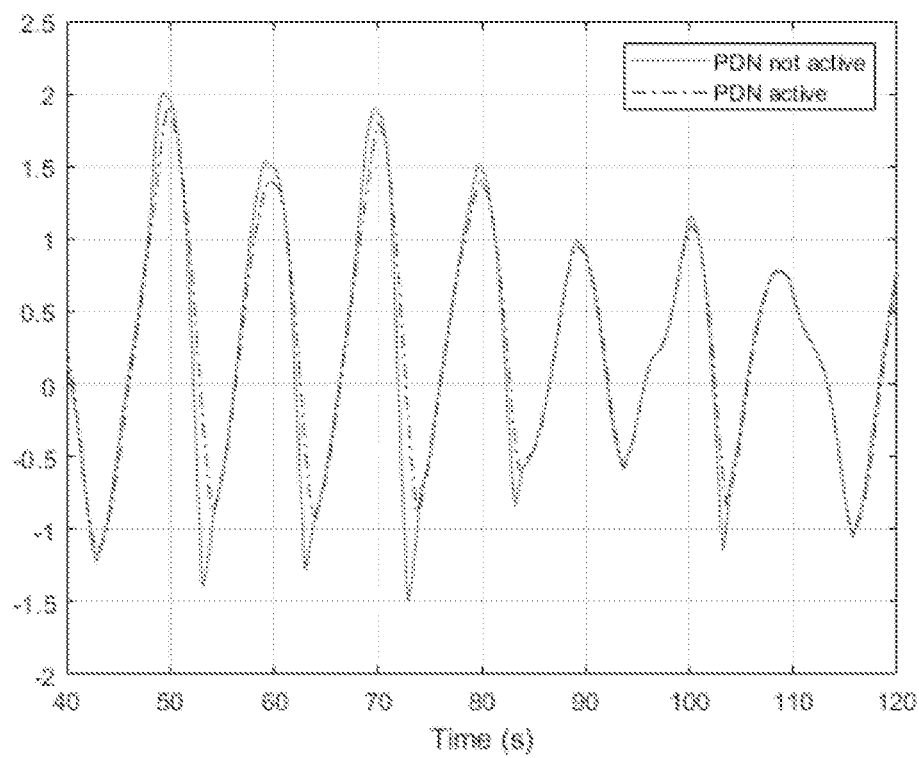
FIG. 8 is a graph of comparing tendon displacement in meters with and without an active power dissipation network.
Figure 9:
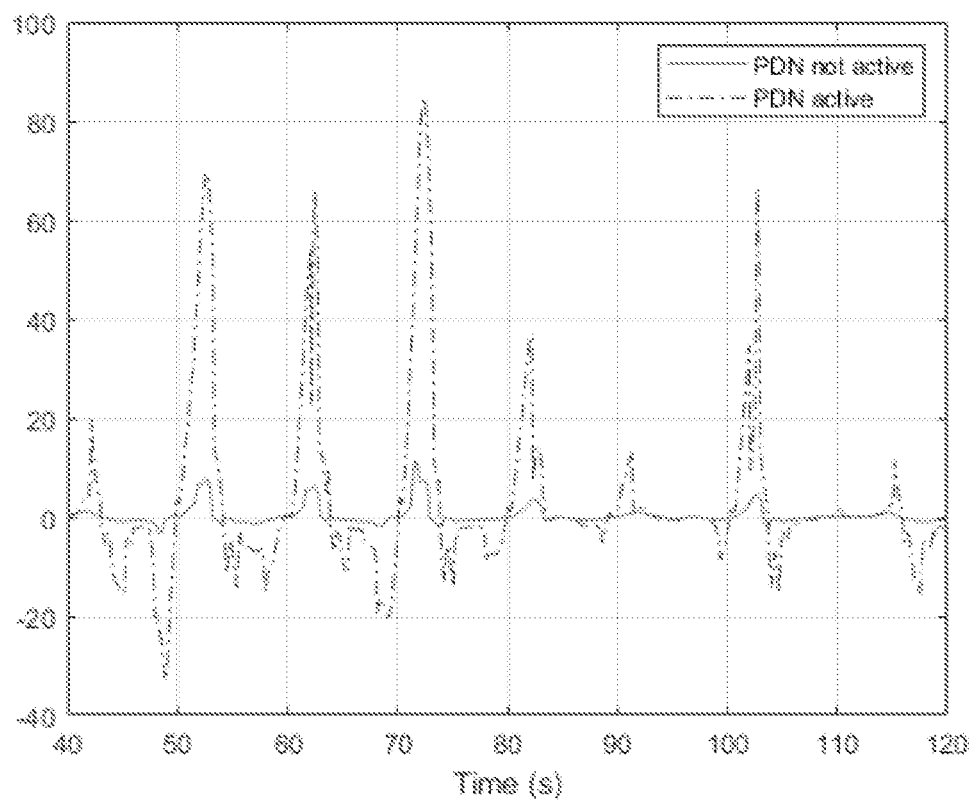
FIG. 9 is a graph showing pressure drop (in bars) across the power dissipation network with and without an active power dissipation network.

FIG. 8 shows the reduction in tendon displacement due to an active PDN. It should be noted that the event at 102s was used in previous figures, because this is the largest motion/power event where the Pressure Relief Valve (PRV) in the PPT was not opened in the simulations with the inactive PDN. Therefore, to show a fair comparison of power distributions that are only attributable to the PDN, this event was chosen. The fact that the PRV opens when the PDN is inactive, but not when the PDN is active, is further evidence of the protection provided by the PDN. The reduction in tendon displacement is mostly due to the increased force opposing its motion in the MLO, which is a result of the pressure drop over the PDN. This is shown in FIG. 9.

Figure 10:
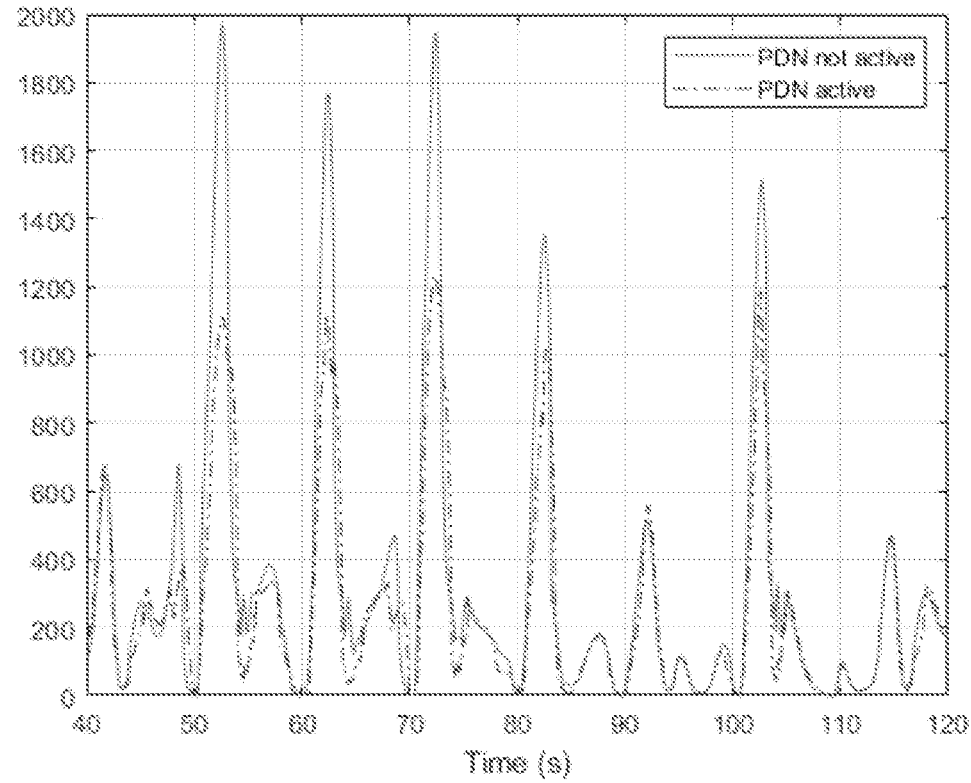
FIG. 10 is a graph of generator power in kW with and without an active power dissipation network.

The effect of the PDN on power transmitted to the generator is shown in FIG. 10. The power reduction due to the PDN is clear in all peak events, where the peaks at 52, 62 and 72s for the simulations with inactive PDN could have been even higher if the PRV had not opened. The figure shows that power limiting due to the PDN is very effective when required with most lower-power events still transmitted so that desired power generation can continue efficiently.

Figures 11, 12:
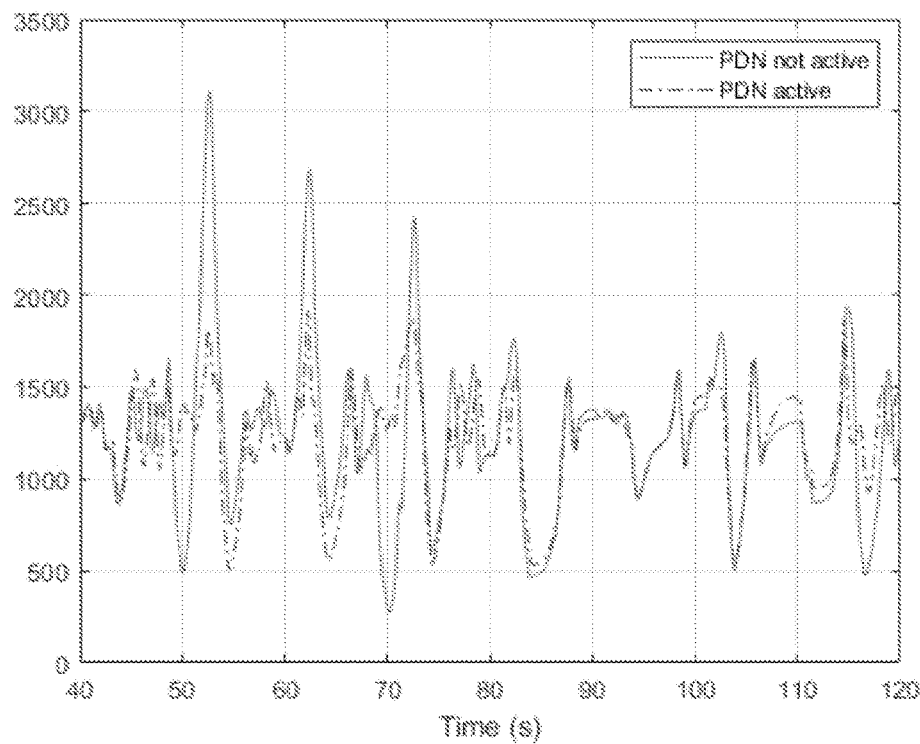
FIG. 11 is a graph of the motor speed in RPMs of the hydraulic motors with and without an active power dissipation network.
FIG. 12 is a table showing results with and without an active power dissipation network.

The speed of the hydraulic motors and generators is shown in FIG. 11. In the simulations all 3 motor/generator sets were controlled in exactly the same way and therefore their speeds are all the same too. In some embodiments, using more advanced control, the swash angle for each motor and the torque applied with each generator can be adjusted individually to tweak performance.

The effects of the PDN are clearly visible in the motor speed. The active PDN protects the system from excessive speed and helps keep it within efficient operating limits. However, during large flow events, the maximum displacement of the motors is not large enough to accommodate all the incoming flow at the set speed and therefore the motors speed up beyond this. As long as this remains within the motor and generator peak speed limits this does not pose a problem. Some peaks in motor speed are immediately followed by dips in speed. These relatively low speeds after events when the set speed is exceeded are caused by delays in the system. During high speed events, the swashplate angle is at a maximum to deal with the large incoming flow. If the cylinder velocity, and therefore the flow, then reduces very quickly, the swashplate angle cannot be reduced fast enough to keep up with the change in flow. This is due to the delays in measurements of the cylinder velocity and system pressure and the limited rate of change that is allowed for the swash angle. Additionally, the torque that is applied by the generator is high when its speed is high, to help keep speed within system limits. The control of the applied torque is based on measurement of system variables as well. Since all measurements have a delay applied to them, the generator can apply a torque that is too high for the smaller flow, thereby reducing the speed quickly. At other times, e.g. around 85 s, the swash angle is at a minimum but the flow is too low to achieve the set speed. If this happens too often in a sea state, control can switch to 2 motor/generator sets, which will increase the motor speed. Additionally, the use of flywheels on one or more motor/generator sets can be explored. Currently, only the inertia of the motors and generators are used, but adding some additional inertia can help keep the speed more constant. The effect of increased inertia on the electrical power production must be considered as part of this study. Table I (depicted in FIG. 12) shows the reduction in power at the generator and in motion at the cylinders. The maximum values for generator input power in the table are for the high-flow event without the PPT PRV opening in both simulations (not the absolute peak flow event). All other quantities are for the entire simulation. The mean power loss at the PDN when it is switched off is due its configuration of relatively narrow pipes. Even when all valves are open, there is a pressure drop at high flow rates. This loss is very small, as can be seen in the table, even in these very high flow events (which should always be damped by the PDN) the loss is only 5.5%, so in normal operating conditions, the loss will be a lot lower. If required and sensible from a cost versus performance point of view, the number of PDN pipes can be increased to further minimize the pressure loss in normal operating conditions.

To test the implementation of a PDN, a scale version of the system was developed where key characteristics of the design can be tested. To aid in the sizing of components for the physical prototype and develop control, a model of the scale prototype was developed first. The model for the prototype was also implemented in Simscape Fluids and is functionally the same as the full scale model. As for the full scale model, the most suitable off-the-shelf components were identified and their data sheets used to build an accurate model of the prototype. The input forces were obtained by scaling down the forces from the full-scale results obtained from OrcaFlex. This approach can change in other embodiments and a linearized radiation/diffraction model of the full scale WEC can be produced using system identification. Some embodiments provide the option to have active feedback between the motion of the cylinders and the force generated in the MLO and PPT.

In the laboratory prototype, there is no weight from the reaction ring that needs to be offset by the MLO. However, to test full system functionality, and especially the PDN within the MLO, it is required that the pressure normally present to provide the offset force be included. The design of the prototype therefore includes a 'weight accumulator'. This is a relatively large accumulator that provides an approximately constant pressure, and therefore force, to the piston of the offset cylinder, representing the weight of the reaction ring. Because a through rod cylinder with equal areas is used, the spring cylinder is held in its equilibrium (center) position by matching the pressure in the offset and weight accumulators. The ring weight can therefore be cancelled out from the input force. The sizes of the PDN pipes, and the control settings that determine which PDN valves close when, were optimized for a range of operational conditions, ensuring the power loss in the PDN is minimal when power in the PPT is below the generator capacity, but large enough to create an appropriate pressure drop when transient high power needs to be dissipated. The optimization was performed within the 3000 psi pressure design limit.

The Simscape model of the lab-scale drivetrain contains the same basic elements as the model for the full scale application, except there is only a single hydraulic motor and generator. The full scale system is expected to have 3 generators coupled to 6 motors arranged in 3 tandem configurations. The PDN and motor control are very similar to the full scale model and differ mainly in threshold settings. This allows the behavior of the full scale device to be replicated at model scale so that important functionality like PDN damping and motor speed can be tested. An approximately 1:10 scale drivetrain was constructed as part of a larger effort to validate the overall concept and performance of the Triton Drivetrain. While not the focus of this work, demonstrating the PDN in practice was an important piece of this work and is discussed here. Although the principle of the PDN is somewhat straightforward, it is important to understand whether the dynamics predicted numerically match those that can be achieved in reality. In particular, we were interested in understanding temperature response times, pressure drops and valve response times. The physical prototype was designed to match the specifications used in the numerical model. The drivetrain has been built to be representative of the full-scale system and includes both power transfer and mean load offset systems. One challenge is that general hydraulic (froude) scaling laws associated with physical models cannot be straightforwardly applied. The prototype representation attempts to maintain hydraulic pressure similitude, and uses as much real world, near full-scale, hydraulic components as possible. As a result, power flows through the system are approximately 1:12 scale. Maximum power in the model is around 30 kW average in the peak test case. The model is excited with a plus or minus 0.5 m stroke linear actuator capable of speeds up to 1 ms$^{-1}$ (just visible behind the laboratory PC). This disclosure presents work on the development of a hydraulic 'Power Dissipation Network' that is able to remove high power peaks from within a WEC PTO. The presented approach converts hydraulic power into heat at times when power or motion limits might be exceeded, and is shown to be effective in realistic numerical simulations. The approach permits the power conversion system to be designed for best efficiency, rather than being oversized to handle peak loads. This results in reductions in the size of equipment across the PTO system, from primary conversion to grid connection.

While there is clearly additional complexity and cost associated with the addition of the PDN, the design has been developed to use only standard open/close cartridge valves with pipes of different length and diameter, i.e. no complex valves or variable orifices, although embodiments may include such. As such the reliability is expected to be high and the PDN costs are expected to be dwarfed by the overall CAPEX reductions due to the use of this system. Further, this approach can also be used in more moderate seas, reducing the peak-to-average power ratio, increasing the quality of exported power and reducing the requirements for batteries, supercapacitors and other electrical equipment. The approach presented uses the control of variable displacement motors and generator damping torque based on intra-system measurements. This, combined with flow reduction due to PDN actions was shown to give adequate ability to keep the generator speed within efficient operating limits. Ongoing development of cross-coupling between PDN and PTO control will increase the effectiveness and efficiency of the interactions between the MLO and PPT sub-systems. The technique of 'peak shaving' presented here does reduce the energy captured, but this is felt to be a valid compromise given the overall benefits. Table I shows a loss of 47 kW or 18% of the electrical energy when the PDN was engaged. However, it should be appreciated that this was due to the large design sea state (a 5 m Hs condition) used in embodiments of this disclosure, selected to demonstrate the efficacy of the approach, and results in a reduction of 324 kW or 22% in electrical design requirement and overall stroke by %18%. To achieve this stroke reduction through electrical damping alone (i.e. No PDN) the generator peak power would need to be over 1400 kW larger in order to apply the appropriate torques. The losses in smaller seas will be lower as the hydraulic flows will be correspondingly lower, however the efficacy of the approach would be the same. The use of the PDN in smaller seas would be very effective at limiting the peak to average to improve power quality. In such nominal seas where 4 m>$H_s$>2 m, energy capture losses due to the PDN are expected to be in the region of 5% while achieving a peak to average output ratio of approximately 5:1.

Embodiments of components of the systems described herein might be coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Additionally, some or all of the functionality described herein might be implemented via one or more controllers, processors, or other computing devices. For example, a controller might be implemented to control the mooring lines, the tether(s) or tendon(s), or modes of the system.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wave energy converter (WEC) system comprising:
   a float,
   a drivetrain;
   a reaction structure coupled to the drivetrain by at least one tendon,
   the drivetrain comprises a power dissipation system coupled to the drivetrain, wherein the power dissipation system is configured to manage peak loads in the WEC system by dissipating peak energy spikes caused by relative movement of the reaction structure and the float: and
   wherein the power dissipation system comprises a hydraulic system with a plurality of pipes and a heat exchanger, and wherein the plurality of pipes each comprise a corresponding valve configured to individually grant fluid access to each pipe, wherein utilizing fewer pipes produces an increased pressure drop and therefore produces more power dissipation and utilizing more pipes produces a reduced pressure drop and less power dissipation, and wherein the hydraulic system does not comprise any other intentional pressure drop causing orifices.

2. The system of claim 1, wherein the power dissipation system uses a pressure drop to heat a hydraulic fluid.

3. The system of claim 1, further comprising a controller, wherein the controller is configured to initiate the power dissipation system when parameters are met.

4. The system of claim 3, wherein the controller is configured to activate the hydraulic system to dissipate heat during the peak energy spikes.

5. A wave energy converter (WEC) system comprising:
a float,
a drivetrain;
a reaction structure coupled to the drivetrain by at least one tendon,
the drivetrain comprises a power dissipation system coupled to the drivetrain, wherein the power dissipation system is configured to create flow restrictions and pressure drops in the system to dissipate peak energy spikes caused by relative movement of the reaction structure and the float; and wherein the power dissipation system comprises a hydraulic system with a plurality of pipes and a heat exchanger, and wherein the plurality of pipes each comprise a corresponding valve configured to individually grant fluid access to each pipe, wherein utilizing fewer pipes produces an increased pressure drop and therefore produces more power dissipation and utilizing more pipes produces a reduced pressure drop and less power dissipation, and wherein the hydraulic system does not comprise any other intentional pressure drop causing orifices.

6. The system of claim 5, wherein the power dissipation system uses the pressure drop to heat a hydraulic fluid.

7. The system of claim 5, further comprising a controller, wherein the controller is configured to initiate the power dissipation system when parameters are met.

8. The system of claim 7, wherein the controller is configured to activate the hydraulic system to dissipate heat during the peak energy spikes.

\* \* \* \* \*